United States Patent [19]

Schulman

[11] 4,386,476

[45] Jun. 7, 1983

[54] EDGE LIGHTED DISPLAY SIGN

[76] Inventor: Manfred Schulman, 111 Caribbean, 25 Old Fort Rd., Durban, South Africa

[21] Appl. No.: 317,838

[22] Filed: Nov. 3, 1981

[51] Int. Cl.³ .......................................... G09F 13/18
[52] U.S. Cl. .................................. 40/546; 40/152.1; 40/152.2
[58] Field of Search .............. 40/442, 446, 546, 152.1, 40/152.2

[56] References Cited

U.S. PATENT DOCUMENTS

| | | | |
|---|---|---|---|
| 1,839,287 | 1/1932 | Wolfson | 40/546 |
| 2,566,488 | 9/1951 | Macau | 40/546 |
| 2,880,536 | 4/1959 | Sullivan | 40/546 |
| 2,906,048 | 9/1959 | Kraus | 40/546 |
| 2,917,838 | 12/1959 | Neugass | 40/546 |
| 3,934,249 | 1/1976 | Sanjana | 40/442 |
| 4,055,014 | 10/1977 | Schmidt et al. | 40/442 |

Primary Examiner—Gene Mancene
Assistant Examiner—Wenceslao J. Contreras
Attorney, Agent, or Firm—Robert J. Van Der Wall

[57] ABSTRACT

An edge lighted display sign is disclosed which provides a base portion, defining a housing for a light source and a variable duty cycle oscillator including an exteriorly disposed ratio control device whereby the light source may be controlled from an "off" position, through an "on" "off" blinking range, from a very slow to a very rapid blinking, to a completely "on" position. A longitudinally extending slot is provided along the top length of the base to receive a lower end length of a transparent panel, formed of a clear or translucent glass or a suitable plastic material, whereby the lower edge portion of the glass panel is directly exposed to the light source. In a preferred form, the light source comprises a fluorescent light tube, and a removable bottom panel is provided for the housing to permit access to the light source and the cycle oscillator. A back side of the transparent panel is provided with an opaque coating or covering. Alternatively, the back side may be frosted. The front side of the panel is adapted to receive any type of message, advertising or the like in contrasting colors to the opaque back side. The messages, advertising, etc. may be of a removable or permanent nature.

7 Claims, 3 Drawing Figures

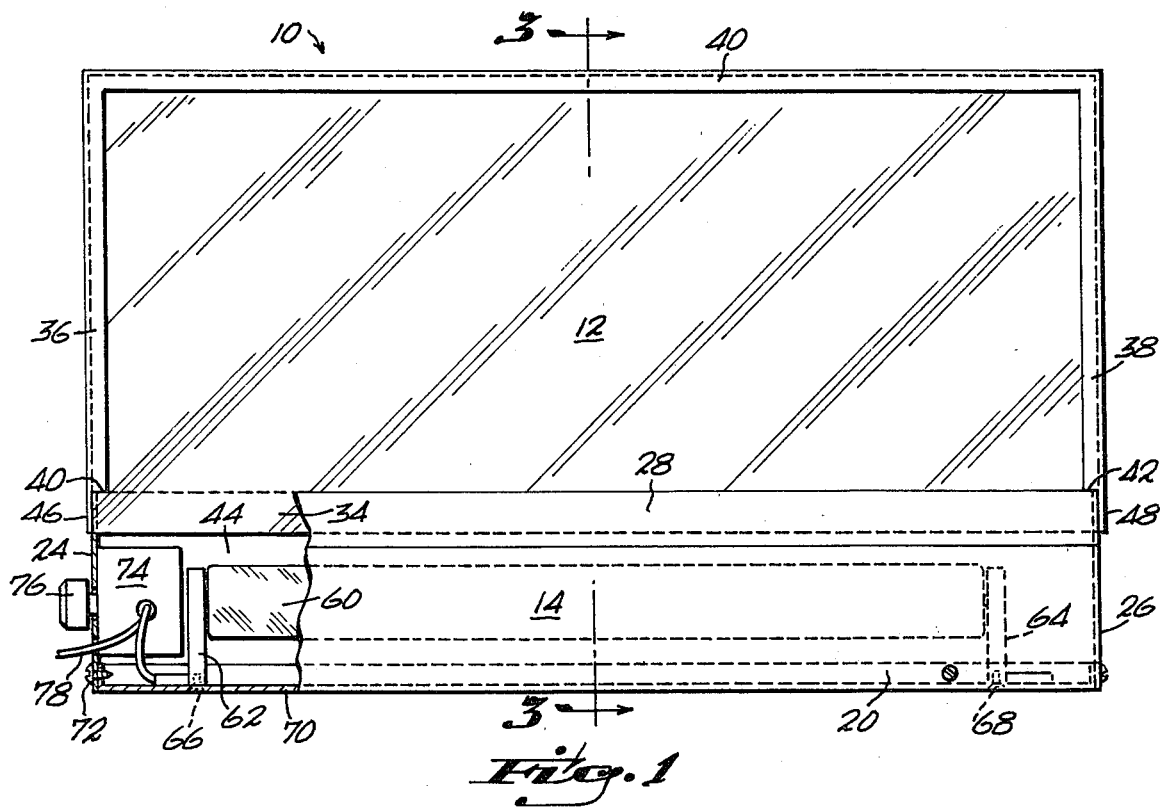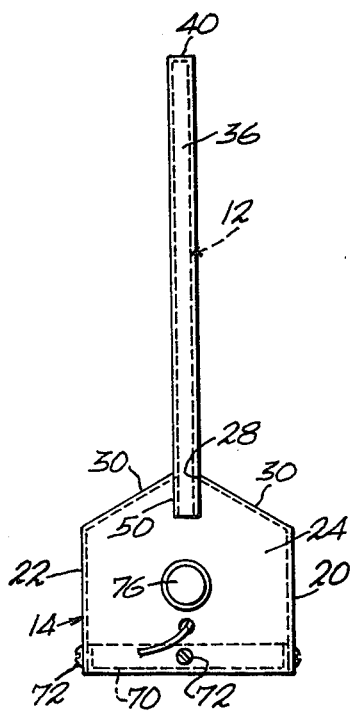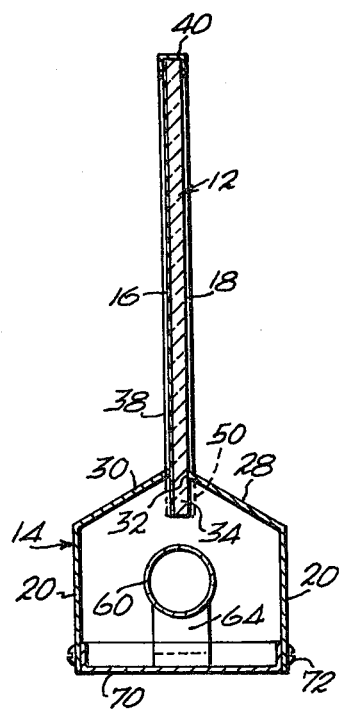

EDGE LIGHTED DISPLAY SIGN

FIELD OF THE INVENTION

The present invention pertains to the field of illuminated signs, and more particularly to an edge lighted sign.

BACKGROUND OF THE INVENTION

Techniques for the display of information and advertising are, of course, ancient. Combinations of various lighting means and signs are practically as old as the art of artificial illumination itself. The present invention deals with a compact, attention attracting, and adjustable means of combining the sign attention making and illumination arts.

It comprises, in part, a transparent or translucent panel having a lower end portion disposed within a lighted inner chamber of a base structure. The inner chamber also houses a variable duty cycle oscillator, provided with an exteriorly disposed ratio control device or knob to control the blinking cycle of the light source within a range extending between completely "on" and "off" positions.

A back side of the panel is provided with an opaque coating or covering, or alternatively may be frosted, while a front side of the panel is adapted to receive a message, advertising, etc., applied by permanent materials such as paint, or removable materials such as crayons, for example. A frame is preferably secured about the exposed side and top edges of the panel to prevent a light loss therethrough, and a removable bottom panel is provided on the base structure to provide access to the inner chamber light source, which is preferably in the form of a fluorescent light tube.

Therefore, one of the principal objects of the present invention is to provide an edge lighted sign including a clear transparent panel having an opaque back side and a transparent or translucent front side which is adapted to receive a message, advertising etc. applied thereto by means of either permanent or removable materials such as paint or crayons, for example, or for displaying photographic transparencies.

Another object of the invention is to provide a base structure for the panel, providing an enclosed inner chamber for a suitable light source, such as a fluorescent light tube, and a longitudinally slotted top side to slidably receive a bottom edge portion of the transparent or translucent panel into a relatively closely adjacent relationship to the light source.

A further object of the invention is to provide a variable duty cycle oscillator, within the chamber, having an exteriorly extending ratio control device or knob.

Yet another object of the invention is to provide a frame about the outwardly exposed side and top edges of the panel, and a removable bottom panel for the housing, to provide access to the light source and cycle oscillator.

Other objects and advantages of the present invention will become apparent to those skilled in the art.

BRIEF DESCRIPTION OF THE DRAWINGS

FIG. 1 is a front elevational view of the edge lighted display sign of the present invention;

FIG. 2 is an elevational view of the left end of the sign as seen in FIG. 1; and FIG. 3 is a cross sectional view taken along line 3—3 of FIG. 1. The invention will be better understood upon reference to the following detailed description and to the appended claims.

DETAILED DESCRIPTION

With reference to the drawings, and particularly to FIG. 1, the edge lighted display sign of the present invention, designated generally at 10 includes a transparent panel 12 and a base assembly 14. The transparent panel 12 is preferably formed of clear glass, although it may be translucent, including a back side, FIG. 3, provided with an opaque coating or covering 16 and a clear or translucent front side 18 for the reception of any type of message, advertising, etc. in contrasting colors to the opaque back side. Hereinafter, the term "clear" will be understood to mean either transparent or translucent. Alternatively, the back side may be frosted to provide for the display of photographic transparencies. The opaque coating or covering 16 may be black, white or other color to contrast with the display on the front side. A message, advertising matter, etc. may be removably applied to the clear front side 18 by suitable means, such as crayonds, or permanently applied thereto, as by paint.

In one preferred form, the base assembly 14 includes, first and second side walls 20, 22, first and second end walls 24, 26, and upwardly converging top wall portions 28, 30 to a longitudinally extending central slot 32, which is sized to slidably receive a lower end portion 34 of the panel 12. Channel frame portions 36, 38 and 40 cover the opposed side and top edges of the panel 12. The respective webs of the frame portions 36, 38 define abutments 40, 42 to limit the penetration of the lower end portion 34 of panel 12 into the chamber 44 of the base 14. The bottom end portions 46, 48 of the side frame portions 36, 38 partially overlie the end walls 24, 26, as at 50, and prevent longitudinal displacement of the panel 12, relative to base 14. Screw means (not illustrated) may be utilized to provide a fixed attachment of the panel frame to the base 14.

As illustrated in FIGS. 1 and 3, a fluorescent light tube 60 is conventionally mounted in opposed end socket members 62, 64, which are fixed at 66, 68 to a removable bottom panel 70 of the base assembly 14. Bottom panel 70 is removably secured in place by a plurality of screws 72.

A conventional variable duty cycle oscillator 74 is secured within the chamber 44 in any conventional manner, and includes a ratio control device 76 projecting exteriorly of the base 14. Suitable electrical wiring 78, from an electrical source, connects between the oscillator and fluorescent tube 60. Oscillator 74 may be controlled by device or knob 76 from an "off" position for light tube 60 to a constant "on" position, through a complete range of blinking speeds.

Having described the presently preferred embodiments of the invention, it should be understood that various changes in construction and arrangement will be apparent to those skilled in the art and are fully contemplated there without departing from the true spirit of the invention. Accordingly, there are covered all alternatives, modifications and equivalents as may be included within the spirit and scope of the invention as defined herein by the appended claims.

What is claimed is:

1. An edge lighted sign comprising:
   a transparent panel having a clear front side and a generally opaque back side;

a base assembly including a plurality of opposed longitudinal side walls, a plurality of opposed end walls, a top wall and a removable bottom wall panel defining an interior chamber and a longitudinal slot along the length of the top wall thereof, opening into said chamber, for sliding reception of a bottom edge portion of the panel to a predetermined depth within said chamber;

a light source mounted within the chamber, adjacent to and beneath a bottom edge of the bottom edge portion;

a frame, secured about a pair of opposed side edges and a top edge of the panel;

means to define the predetermined depth that includes a plurality of like, top opening vertical slots formed respectively in the end walls for engagement by opposed bottom end side portions of the panel; and means to prevent longitudinal displacement of the panel in the slot.

2. The edge lighted sign as defined in claim 1 wherein the top wall comprises a plurality of upwardly converging top wall portions, defining the longitudinal slot between confronting upper edges thereof.

3. The edge lighted sign as defined in claim 1 wherein the light source comprises:
a fluorescent light tube mounted between a plurality of conventional socket members, secured to an inner side of the removable bottom panel.

4. The edge lighted sign as defined in claim 1 further comprising a variable duty cycle oscillator mounted within the chamber in electrical connection to the light source and including an exteriorly positioned ratio control device.

5. The edge lighted sign as defined in claim 1 wherein the means to prevent longitudinal displacement of the panel comprises bottom end portions of opposed vertical side portions of the frame which overlie respective outer surface portions, respectively, of the end walls.

6. The edge lighted sign as defined in claim 1 wherein the generally opaque back side is covered by a suitable opaque material of a predetermined color to contrast with colors to be applied to the clear front side.

7. The edge lighted sign as defined in claim 1 wherein the generally opaque back side is frosted.

* * * * *